(12) United States Patent
Takagi et al.

(10) Patent No.: US 7,873,975 B2
(45) Date of Patent: Jan. 18, 2011

(54) TELEVISION BROADCAST RECEIVER

(75) Inventors: Toshihiro Takagi, Daito (JP); Tatsuo Miyagawa, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1198 days.

(21) Appl. No.: 11/167,271

(22) Filed: Jun. 28, 2005

(65) Prior Publication Data

US 2005/0289609 A1    Dec. 29, 2005

(30) Foreign Application Priority Data

Jun. 28, 2004    (JP) .............................. 2004-189977

(51) Int. Cl.
*H04N 7/20*    (2006.01)
(52) U.S. Cl. .................... 725/68; 725/72; 725/139; 348/732; 348/734; 348/570
(58) Field of Classification Search ............... 725/68, 725/72, 139, 150; 348/732, 734, 570; 455/87, 455/150.1, 454
See application file for complete search history.

(56) References Cited

U.S. PATENT DOCUMENTS

| | | | | |
|---|---|---|---|---|
| 4,837,627 A | * | 6/1989 | Mengel | 348/731 |
| 5,404,161 A | * | 4/1995 | Douglass et al. | 725/15 |
| 5,870,685 A | * | 2/1999 | Flynn | 455/573 |
| 6,229,480 B1 | * | 5/2001 | Shintani | 342/359 |
| 6,445,917 B1 | * | 9/2002 | Bark et al. | 455/423 |
| 6,525,779 B1 | * | 2/2003 | Sakakibara et al. | 348/558 |
| 6,985,190 B1 | * | 1/2006 | Klopfenstein et al. | 348/569 |
| 7,015,809 B1 | * | 3/2006 | Sayers et al. | 340/539.1 |
| 7,042,526 B1 | * | 5/2006 | Borseth | 348/731 |
| 7,472,409 B1 | * | 12/2008 | Linton | 725/76 |
| 2001/0031648 A1 | * | 10/2001 | Proctor et al. | 455/562 |
| 2002/0071056 A1 | * | 6/2002 | Iwata et al. | 348/571 |
| 2002/0082016 A1 | * | 6/2002 | Obayashi | 455/436 |
| 2002/0113896 A1 | * | 8/2002 | Takagi et al. | 348/569 |
| 2002/0116704 A1 | * | 8/2002 | Tani et al. | 725/25 |

(Continued)

FOREIGN PATENT DOCUMENTS

JP    62-269404    11/1987

(Continued)

OTHER PUBLICATIONS

Office Action dated Nov. 17, 2009 in JP 2004-189977.

*Primary Examiner*—Brian T Pendleton
*Assistant Examiner*—Jonathan Lewis
(74) *Attorney, Agent, or Firm*—Crowell & Moring LLP

(57) ABSTRACT

A television receiver is connected to a multi-directional antenna, and stores, in a memory, a receiving direction table containing: channel numbers; best receiving directions of the multi-directional antenna for receiving the respective channels; and register channel information indicating whether the channels are registered as selectable or non-selectable. The receiving direction table is used for selecting each channel. Based on the operation of a user interface by a user (S42), the register channel information of the receiving direction table can be changed (S44, S46), so that the user can optionally set selectable channels. Best receiving directions of channels registered in the receiving direction table as non-selectable are deleted from the receiving direction table (S45), so that the amount of information stored in the memory can be reduced, thereby saving capacity of the memory.

1 Claim, 9 Drawing Sheets

U.S. PATENT DOCUMENTS

| | | | |
|---|---|---|---|
| 2002/0178449 A1* | 11/2002 | Yamamoto et al. | 725/56 |
| 2004/0105031 A1* | 6/2004 | Shibusawa | 348/570 |
| 2004/0157645 A1* | 8/2004 | Smith et al. | 455/562.1 |
| 2005/0094585 A1* | 5/2005 | Golden et al. | 370/310 |
| 2006/0053458 A1* | 3/2006 | Borseth | 725/100 |

FOREIGN PATENT DOCUMENTS

| | | |
|---|---|---|
| JP | HEI-2-101609 | 8/1990 |
| JP | 04-345329 | 1/1992 |
| JP | 06-113220 | 4/1994 |
| JP | 08-250920 | 9/1996 |
| JP | 3060974 | 6/1999 |
| JP | 2002-344832 | 11/2002 |
| JP | 2003-163849 | 6/2003 |

* cited by examiner

| CHANNEL NUMBER | REGISTER FLAG | BEST RECEIVING DIRECTION |
|---|---|---|
| 1 | O | 2 |
| 2 | O | 3 |
| 3 | O | 9 |
| 4 | O | 15 |
| 5 |  | 7 |
| ⋮ | ⋮ | ⋮ |
| 129 | O | 6 |

FIG.9

RECEIVING DIRECTION TABLE

| CHANNEL NUMBER | REGISTER FLAG | BEST RECEIVING DIRECTION |
|---|---|---|
| 1 | ○ | 2 |
| 2 | ○ | 3 |
| 3 | | |
| 4 | ○ | 15 |
| 5 | ○ | 8 |
| ⋮ | ⋮ | ⋮ |
| 129 | ○ | 6 |

TELEVISION BROADCAST RECEIVER

BACKGROUND OF THE INVENTION

1. Field of the Invention

The present invention relates to a television broadcast receiver for receiving television broadcast signals transmitted from multiple directions.

2. Description of the Related Art

In the North American Continent where ATSC (Advanced Television Systems Committee) digital television is broadcast, big cities spread across the plains. Accordingly, digital television broadcast signals, which are broadcast in big cities or their suburbs, can be received in other cities or intermediate areas between the cities. In addition, NTSC (National Television System Committee) analog television continues to be broadcast. From the viewpoint of each television user or viewer, television broadcast signals come from various directions. Thus, it is necessary for the television user to adjust the direction of an antenna in the direction of a transmission tower transmitting a television broadcast signal of a television program which the user wishes to watch.

For this reason, multi-directional antennas such as a so-called smart antenna are put to practical use. The EIA (Electronic Industries Association)-909 standard provides a smart antenna having sixteen equiangular receiving directions in 360 degrees. Multi-directional antennas which are actually commercialized have various types such as one that changes the receiving direction by rotating the antenna using a motor, and one that has multiple antennas and selects an active antenna direction by turning on and off electronic switches (the antenna themselves do not rotate).

Some of television broadcast receivers each connected to such multi-directional antenna are each set to be able to adjust the receiving direction of the multi-directional antenna, and have an omni-directional scanning function to automatically select the receiving direction of the multi-directional antenna in which a television broadcast signal of a channel selected by a television user can be best received (such receiving direction being hereafter referred to simply as "best receiving direction").

Further, it is known to determine a best receiving direction for each channel, and preliminarily store information of the best receiving direction in a memory so as to automatically control the receiving direction of an antenna for channel selection on the basis of the stored information (refer to e.g. Japanese Laid-open Patent Publications Hei 8-250920 and Hei 4-345329).

However, according to the prior art including the two Japanese Patent Publications, it is not possible for a user to optionally set selectable channels and non-selectable channels, although it is possible to store information of each selectable channel in a memory, and to control an antenna for channel selection on the basis of the stored information. Furthermore, from the viewpoint of saving memory capacity, it is not preferable to store, in the memory, information of channels which the user does not desire to view.

SUMMARY OF THE INVENTION

An object of the present invention is to provide a television broadcast receiver that can allow a user to optionally set selectable channels and non-selectable channels, and that can save capacity of a memory for storing information of respective channels of television broadcast signals transmitted from broadcast stations.

According to the present invention, we provide a television broadcast receiver connected to a multi-directional antenna having predetermined multiple receiving directions for receiving a television broadcast signal, transmitted in one of multiple channels from one of multiple broadcast stations, by making one of the multiple receiving directions active.

The television broadcast receiver comprises: a tuner connected to the multi-directional antenna for receiving a television broadcast signal; a memory for storing a receiving direction table containing information of channel numbers of the channels transmitted from the broadcast stations, information of best receiving directions of the multi-directional antenna for receiving the channels, and register channel information indicating whether the channels are registered therein as selectable channels or non-selectable channels; a channel selection control unit for controlling a channel selection operation for a channel registered in the receiving direction table as a selectable channel in a manner that based on the receiving direction table stored in the memory, the channel selection control unit outputs, to the multi-directional antenna, a receiving direction control signal to command the multi-directional antenna for an active receiving direction, and also outputs, to the tuner, a channel control signal to command the tuner for a channel to select; and an omni-directional scanning unit.

The omni-directional scanning unit is provided to perform an omni-directional scanning process: of sequentially outputting the receiving direction control signal to the multi-directional antenna to sequentially command the multi-directional antenna for all the receiving directions, and to receive the television broadcast signal in the respective receiving directions; and of determining the best receiving direction and the register channel information of arbitrary one of the channels, transmitted from the broadcast stations, on the basis of signal intensities of the television broadcast signal in the respective receiving directions; and further of renewing the content of the receiving direction table on the basis of the determination.

The television broadcast receiver further comprises a user interface to be operated by a user for manually changing the register channel information of the receiving direction table stored in the memory, and also comprises a receiving direction table editing unit for performing a receiving direction table editing process in a manner: that when based on the operation of the user interface by the user, a channel registered in the receiving direction table as a selectable channel is newly registered in the receiving direction table as a non-selectable channel, the receiving direction table editing unit deletes the best receiving direction of the channel in the receiving direction table; and that when based on the operation of the user interface by the user, a channel registered in the receiving direction table as a non-selectable channel is newly registered in the receiving direction table as a selectable channel, the omni-directional scanning unit determines a best receiving direction of the channel, and stores the thus determined best receiving direction in the receiving direction table.

According to the television broadcast receiver of the present invention, based on the operation of a user interface by a user, it is possible to change the register channel information of the receiving direction table, which indicates whether the respective channels are registered as selectable or non-selectable. Accordingly, the user can optionally set selectable channels. Thus, the user can preliminarily delete channels in bad receiving conditions from candidates of selectable channels.

Furthermore, when based on the operation of the user interface by the user, a channel registered in the receiving direction table as a selectable channel is newly registered in the receiving direction table as a non-selectable channel, the best receiving direction in the receiving direction table is deleted from the receiving direction table. This makes it possible to reduce the amount of information stored in the memory, thereby saving capacity of the memory. In addition, when based on the operation of the user interface by the user, a channel registered in the receiving direction table as a non-selectable channel is newly registered in the receiving direction table as a selectable channel, a best receiving direction of the channel can be easily renewed by an omni-directional scanning process.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 9 is a schematic view showing the receiving direction table after the receiving direction table editing process.

DESCRIPTION OF THE PREFERRED EMBODIMENTS

The best modes and preferred embodiments of the present invention will be described hereinafter with reference to the annexed drawings. Note that the specific embodiments described are not intended to cover the entire scope of the present invention, and hence the present invention is not limited to only the specific embodiments.

Figure 1:
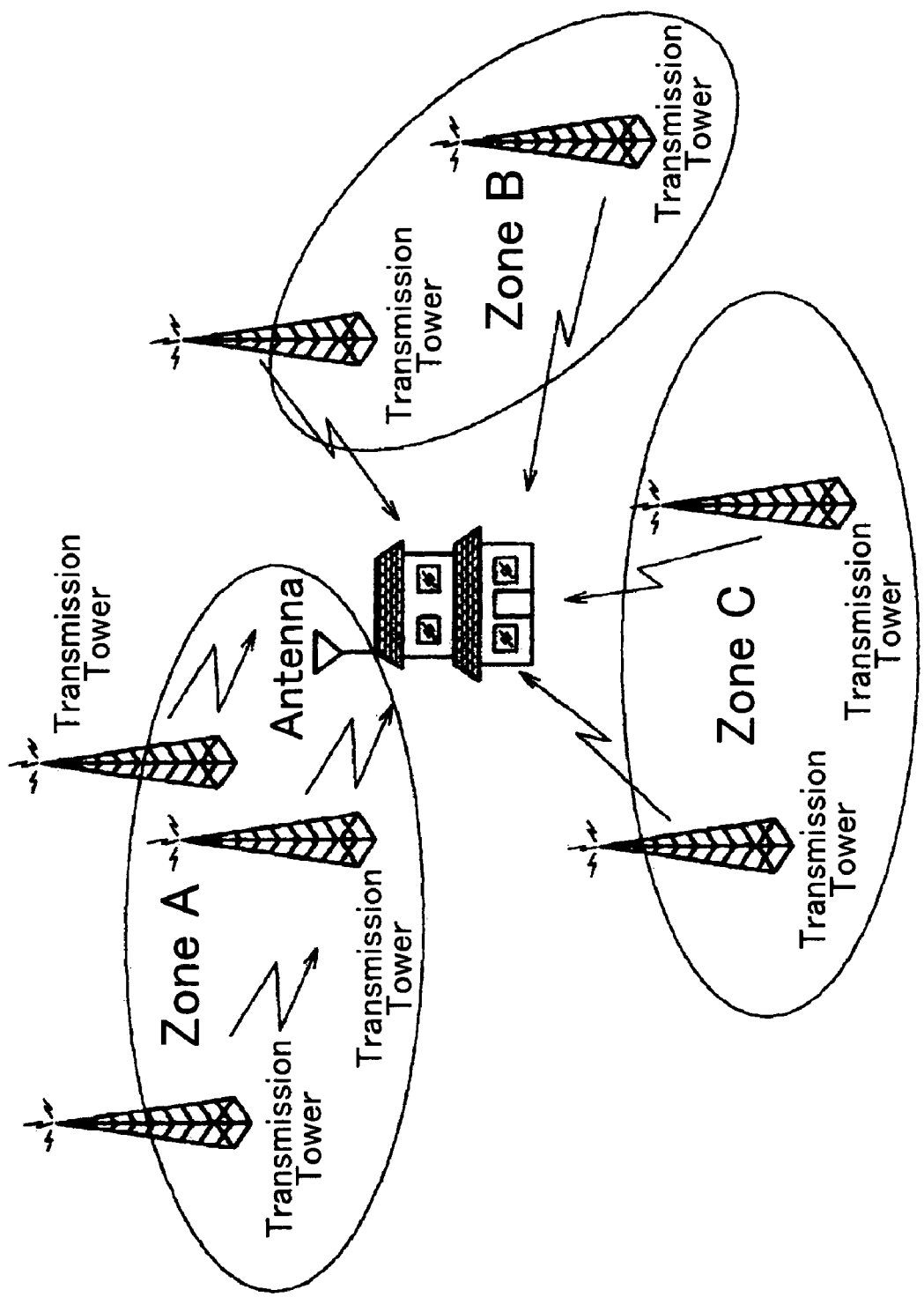
FIG. 1 is a schematic view showing a situation in which a user at home receives TV (television) broadcast signals of broadcast stations from transmission towers located in various zones.

FIG. 1 is a schematic view showing a situation in which a user in a general home receives digital television (TV) broadcast signals of broadcast stations (hereafter referred to simply as "TV broadcast signals") from transmission towers located in various zones. Generally, if a TV broadcast receiver receives digital TV broadcast signals of digital (terrestrial) TV broadcast which have a signal intensity equal to or higher than a predetermined threshold value, it is possible to obtain images of a certain quality or higher, using error correction and the like. Here, it is assumed that as shown in FIG. 1, the TV broadcast receiver in the home of the user can receive TV broadcast signals transmitted from transmission towers spreading across multiple locations e.g. in zone A, zone B and zone C, thereby making it possible to view TV programs from the broadcast stations. A multi-directional antenna, called a smart antenna, having multiple receiving directions is put to practical use for such situation.

Figure 2:
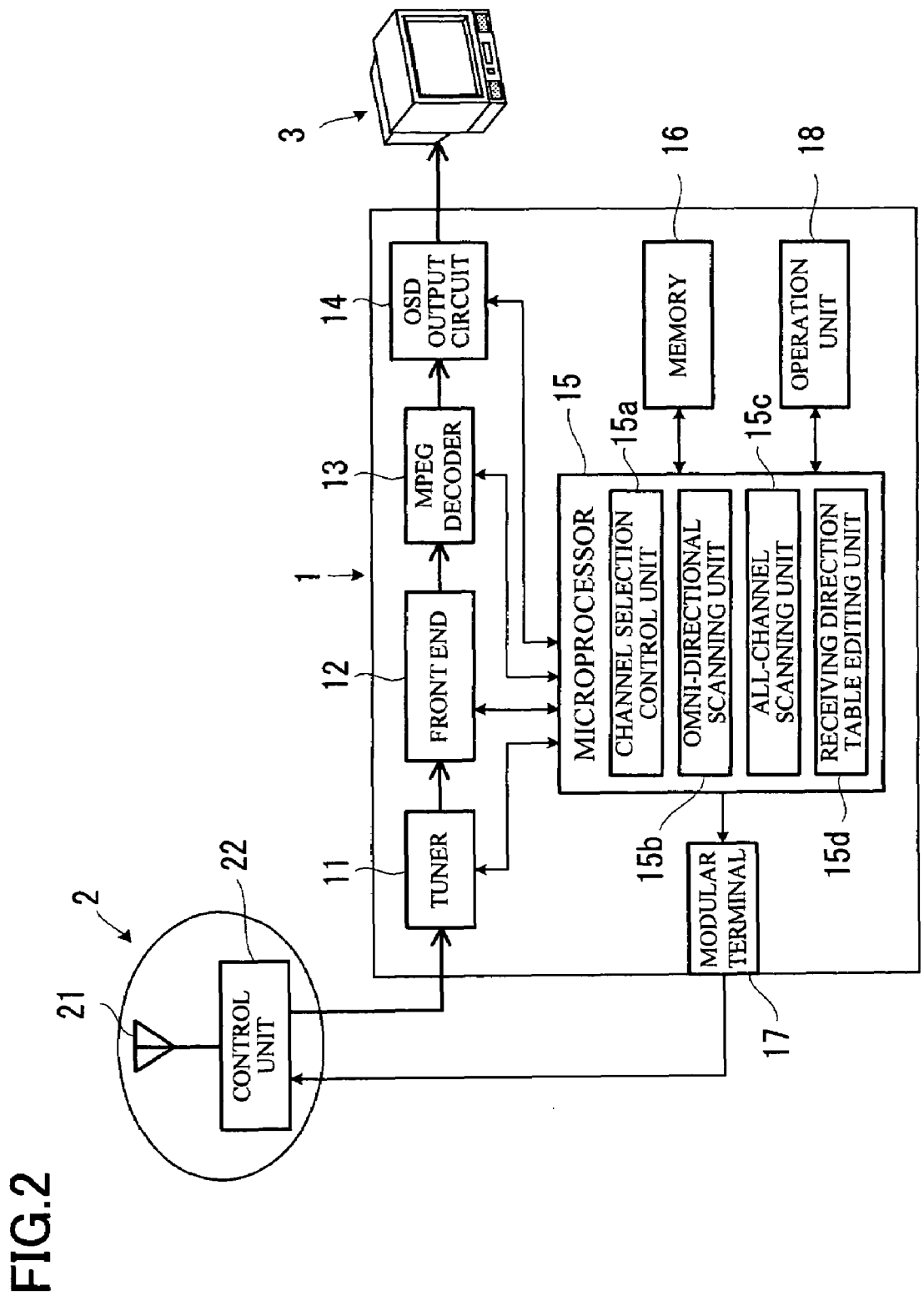
FIG. 2 is a schematic block diagram showing a TV broadcast receiver according to an embodiment of the present invention.

FIG. 2 is a schematic block diagram showing a TV broadcast receiver 1 according to an embodiment of the present embodiment. The TV broadcast receiver 1 is connected to a smart antenna (multi-directional antenna) 2 having multiple receiving directions, and switches an active receiving direction of the smart antenna (namely, makes one of the multiple receiving directions of the smart antenna active) so as to receive a TV broadcast signal transmitted in a given frequency band from one of the transmission towers spreading across the multiple locations, and to output a TV program contained in the TV broadcast signal in each channel to a monitor 3. Note that in the present embodiment, a physical channel that is a frequency band of carrier wave used for a TV program is referred to simply as "channel".

Referring to FIG. 2, the TV broadcast receiver 1 comprises: a tuner 11 connected to the smart antenna 2 for receiving a TV broadcast signal; a front end 12 for subjecting the TV broadcast signal received by the tuner 11 to predetermined signal processing, and decoding the received TV broadcast signal; an MPEG (Motion Picture Experts Group) decoder 13 for decoding the TV broadcast signal which is an MPEG-compressed signal; an on-screen display (OSD) output circuit 14 (output circuit) for superimposing a signal of a predetermined display image on the decoded TV broadcast signal; a microprocessor 15 for detecting receiving conditions of TV broadcast signals received by the tuner 11 so as to control a control unit 22 of the smart antenna 2, and for controlling the entire TV broadcast receiver 1; and a memory 16 for storing a receiving direction table containing later described register channel information.

The TV broadcast receiver 1 further comprises: an operation unit (user interface) 18 to be operated by a user for manually changing or editing the register channel information in the receiving direction table; a modular terminal 17; and so on. The operation unit 18 can be replaced by a remote control receiver (not shown) to operate with a remote control (user interface, not shown) in a manner that the remote control receiver is connected to the microprocessor 15, and the user operates the remote control to wirelessly send, to the remote control receiver, an operation signal for changing or editing the register channel information in the receiving direction table, while the remote control receiver receives the operation signal from the remote control, and outputs the received operation signal to the microprocessor 15.

The microprocessor 15 serves as a channel selection control unit 15a for controlling a channel selection operation for a channel registered in the receiving direction table as a selectable channel in a manner that based on the receiving direction table stored in the memory 16, the microprocessor 15 outputs, to the smart antenna 2, a receiving direction control signal to command the smart antenna 2 for an active receiving direction, and also outputs, to the tuner 11, a channel control signal to command the tuner 11 for a channel to select. Furthermore, the microprocessor 15 serves as an omni-directional scanning unit 15b, an all-channel scanning unit 15c and a receiving direction table editing unit 15d for performing an omni-directional scanning process, an all-channel scanning process and a receiving direction table editing process, respectively, as will be described later.

The receiving direction table stored in the memory 16 contains: channel numbers of respective channels transmitted from the broadcast stations via the transmission towers; best receiving directions of the smart antenna 2 for receiving the respective channels; and register channel information indicating whether the respective channels are registered as selectable channels, or registered as non-selectable channels. Based on the register channel information, the microprocessor 15 performs channel selection from only the channels which are registered therein as the selectable channels. In the channel selection, the microprocessor 15 reads, from the memory 16, the best receiving direction of a channel to be selected. The microprocessor 15 further outputs, to the smart antenna 2, a receiving direction control signal to command the best receiving direction for the channel selection. In the descriptions below, the state where a channel is registered as a selectable channel is referred to as "on-state of register flag" or "register flag on", while the state where a channel is registered as a non-selectable channel is referred to as "off-state of register flag" or "register flag off".

When a user operates to change the register channel information in the receiving direction table stored in the memory 16 in a later described receiving direction table editing process, the OSD output circuit 14 outputs, to the monitor 3, an image showing the channel numbers, the best receiving directions and the register channel information registered in the receiving direction table.

Figure 3:
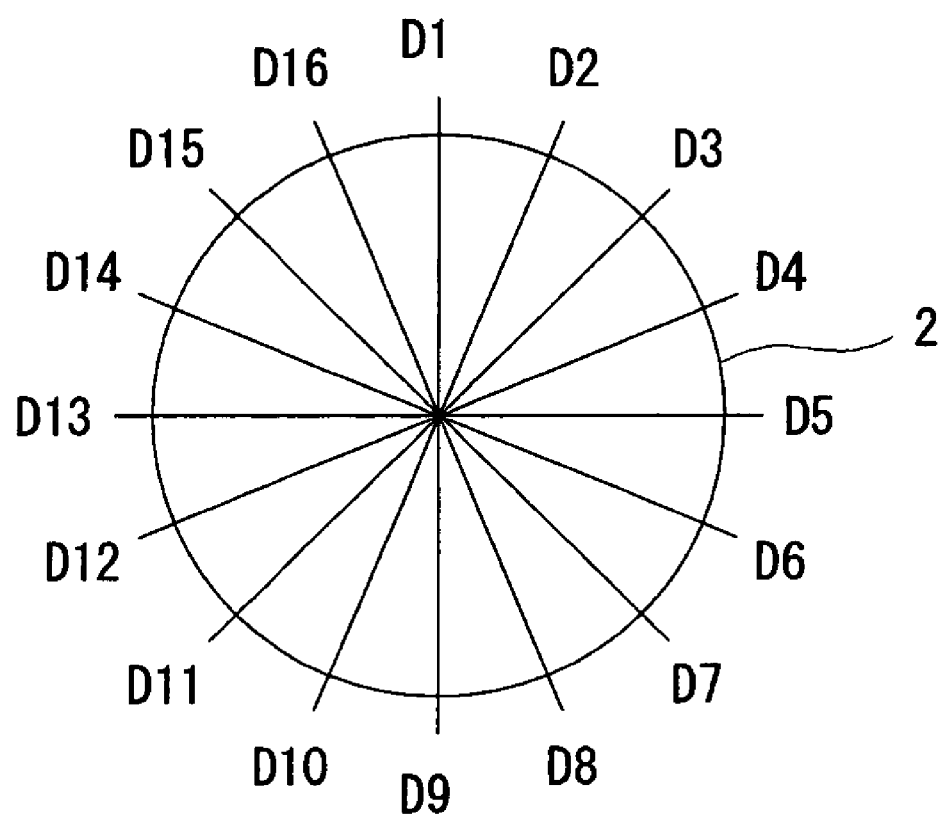
FIG. 3 is a chart showing and explaining multiple receiving directions of a smart antenna connected to the TV broadcast receiver.

FIG. 3 is a chart showing and explaining multiple receiving directions of the smart antenna 2. When connected to the smart antenna 2, the TV broadcast receiver 1 according to the present embodiment receives, and measures receiving conditions of, TV broadcast signals coming from sixteen receiving directions provided in the EIA-909 standard as indicated by D1 to D16 in FIG. 3, respectively. The smart antenna 2 comprises: an antenna unit 21 for receiving TV broadcast signals from the sixteen receiving directions D1 to D16 by mechanically or electronically switching an active receiving direction (namely, making one of the multiple receiving directions active); and a control unit 22 for controlling the operation of the antenna unit 21. Based on the receiving direction control signal from the TV broadcast receiver 1, the control unit 22 makes active one of the multiple receiving directions D1 to D16 of the antenna unit 21 which is commanded by the receiving direction control signal.

Figure 4:
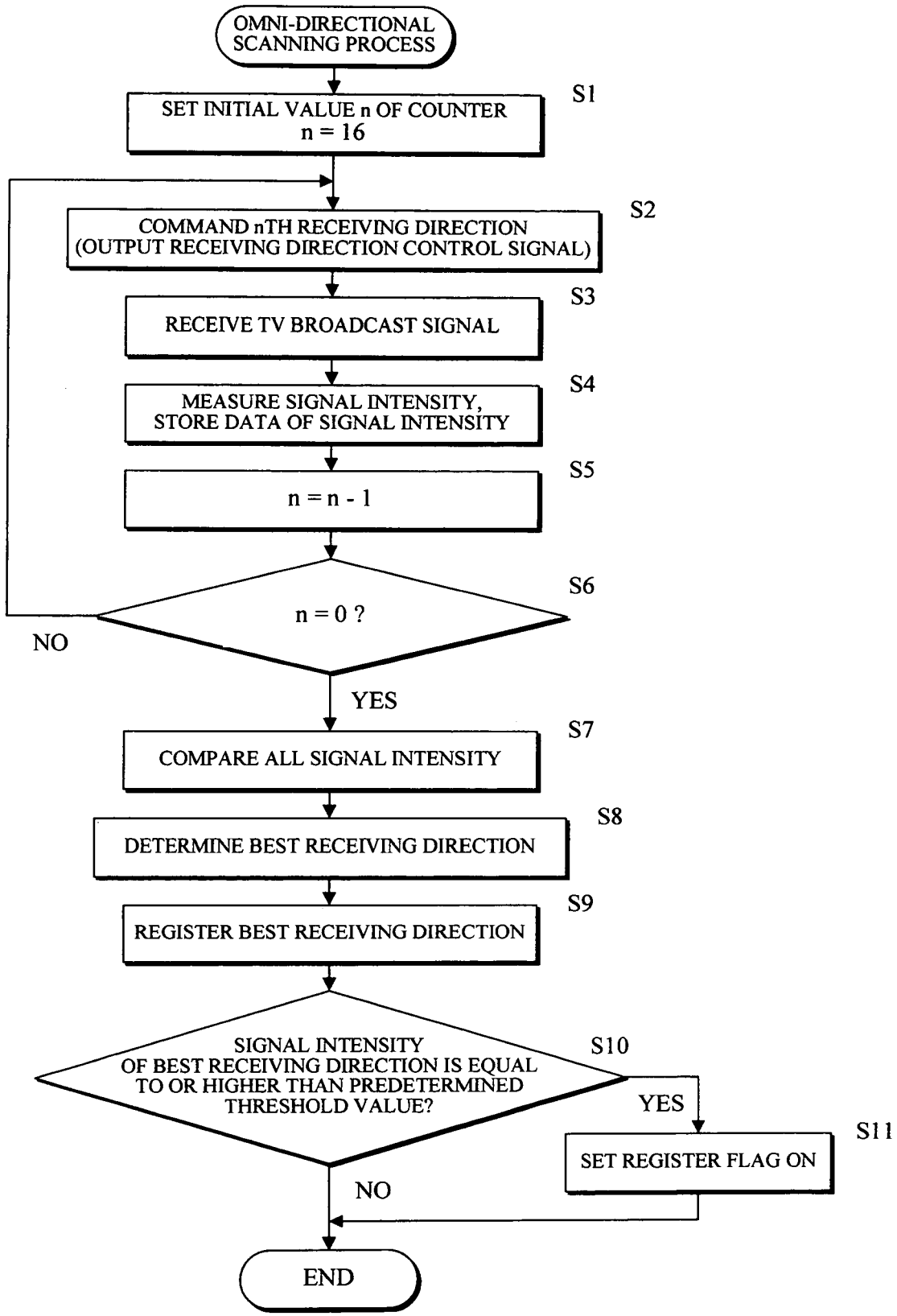
FIG. 4 is a flow chart showing an omni-directional scanning process performed by the TV broadcast receiver.

Hereinafter, referring to the flow chart of FIG. 4, an omni-directional scanning process performed by the TV broadcast receiver 1 for determining e.g. a best receiving direction for an arbitrary one of broadcast stations (arbitrary one of transmission towers) will be described.

When a user selects an omni-directional scanning mode, and sets a channel for which a best receiving direction is to be determined, the microprocessor 15 sets an initial value n (n=16 here) of a counter according to the number of the receiving directions D1 to D16 of the smart antenna 2 (S1). The microprocessor 15 outputs, to the smart antenna 2, a receiving direction control signal to command an nth receiving direction (S2), so that the tuner 11 receives a TV broadcast signal of the set channel (S3). The TV broadcast receiver 1 further measures the signal intensity of the received TV broadcast signal, and stores the measured data of signal intensity in the memory 16 (S4).

Thereafter, the microprocessor 15 decrements the counter by one (S5), and determines whether or not the TV broadcast receiver 1 has measured signal intensities of the received TV broadcast signal for all the receiving directions of the smart antenna 2 (S6). If the TV broadcast receiver 1 has not measured signal intensities of the TV broadcast signal for all the receiving directions (NO in S6), the TV broadcast receiver 1 goes back to the step S2, and measures the signal intensity or intensities of the TV broadcast signal not having been measured (more specifically measures the signal intensity of the TV broadcast signal, for each subsequent receiving channel until completion). In other words, for determining the best receiving direction of a channel, the microprocessor 15 (omni-directional scanning unit 15b) performs an omni-directional scanning process by sequentially outputting the receiving direction control signal to the smart antenna 2 to sequentially command the smart antenna 2 for all the receiving directions, and to receive the TV broadcast signal in the respective receiving directions, so as to sequentially scan all the receiving directions of the smart antenna 2.

If the TV broadcast receiver 1 completes the measurements of the signal intensities of the TV broadcast signal for all the receiving directions (YES in S6), so that the TV broadcast receiver 1 stores all the measured data of signal intensities in the memory 16, the microprocessor 15 reads the measured data stored in the memory 16. The microprocessor 15 then compares all the signal intensities (S7), and thereby determines the receiving direction to give the maximum signal intensity as a best receiving direction of the TV broadcast signal (S8), and further registers the best receiving direction for the channel in the receiving direction table (S9).

The microprocessor 15 furthermore determines whether or not the signal intensity of the best receiving direction is equal to or higher than a predetermined threshold value (S10). If it is equal to or higher than the predetermined threshold value (YES in S10), the microprocessor 15 sets the register flag on for the channel in the receiving direction table (S11), thereby ending the process. On the other hand, if the signal intensity of the best receiving direction is lower than the predetermined threshold value (NO in S10), the microprocessor 15 does not set the register flag on for the channel in the receiving direction table (namely maintains the off-state of register flag), thereby ending the process. In other words, based on the signal intensities of the TV broadcast signal in the respective receiving directions, the microprocessor 15 (omni-directional scanning unit 15b) performs an omni-directional scanning process by determining the best receiving direction and the register channel information of arbitrary one of the channels transmitted from the broadcast stations, and by renewing the content of the receiving direction table on the basis of the determination.

Figure 5:
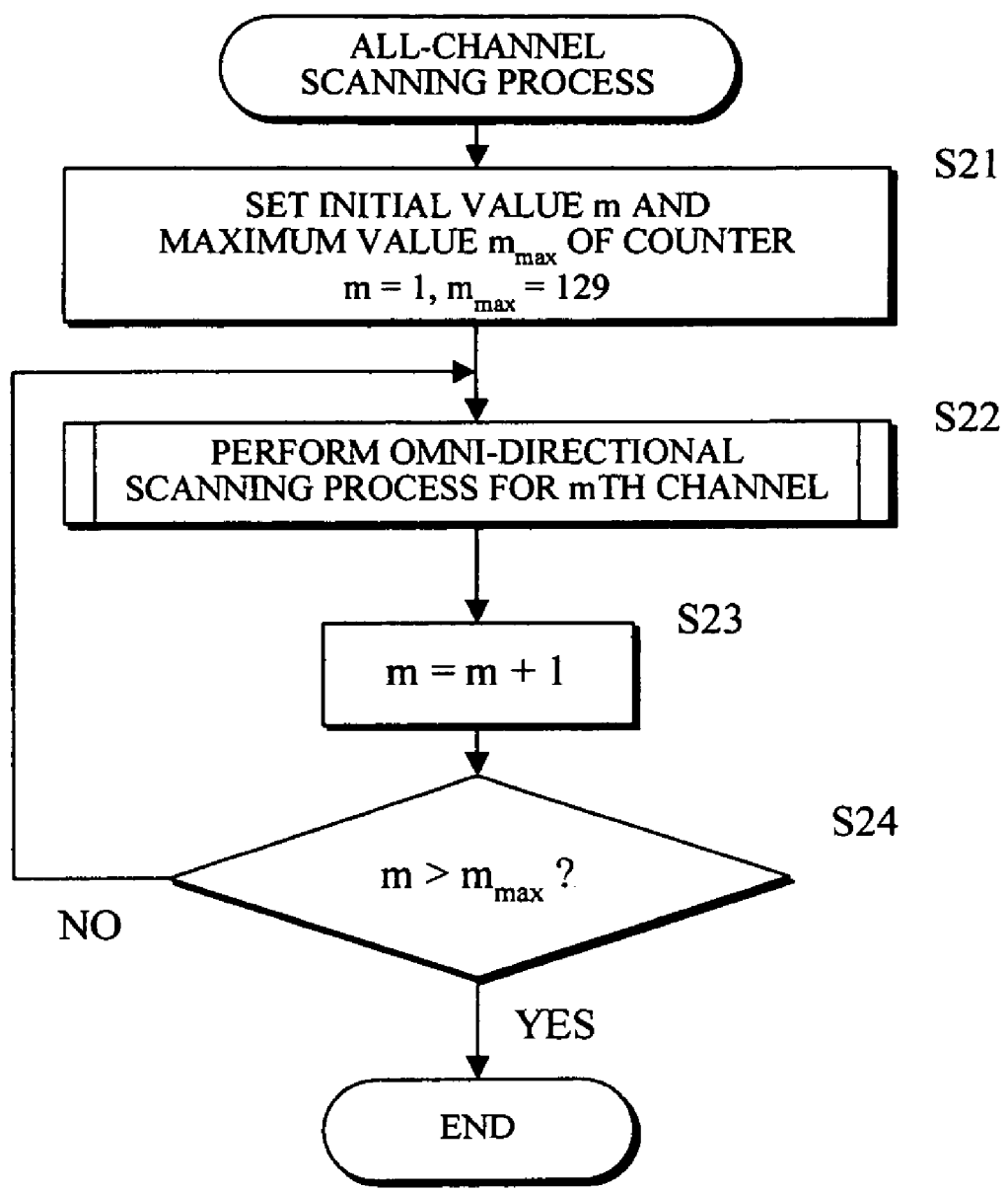
FIG. 5 is a flow chart showing an all-channel scanning process performed by the TV broadcast receiver.

Next, referring to the flow chart of FIG. 5, an all-channel scanning process performed by the microprocessor 15 for determining e.g. a best receiving direction for each of all channels (all receivable channels) transmitted from all broadcast stations (all transmission towers) will be described.

When a user selects an all-channel scanning mode, the microprocessor 15 sets, according to the number of channels transmitted from the broadcast stations, an initial value m of a counter as well as a number $m_{max}$ of channels for each of which a best receiving direction is to be determined (S21). By performing the omni-directional scanning process described above for an mth channel, the microprocessor 15 determines a best receiving direction and register channel information for the mth channel, and registers the best receiving direction and the register channel information in the receiving direction table (S22).

Thereafter, the microprocessor 15 increments the counter by one (S23), and determines whether or not the microprocessor 15 itself has completed the omni-directional scanning process for all the channels (S24). If the microprocessor 15 has not completed the omni-directional scanning process for all the channels (NO in S24), the microprocessor 15 goes back to the step 22, and performs the omni-directional scanning process for the channels not having been subjected to the omni-directional scanning process (more specifically performs the omni-directional scanning process for each subsequent channel until completion). If the microprocessor 15 completes the omni-directional scanning process for all the channels (YES in S24), the microprocessor 15 ends the process. In other words, the microprocessor 15 (all-channel scanning unit 15c) causes the omni-directional scanning unit 15b to repeat the omni-directional scanning process for determining the best receiving direction and the register channel information of each of all the channels transmitted from the broadcast stations, and for renewing the content of the receiving direction table on the basis of the determination.

Figure 6:
FIG. 6 is a schematic view showing an example of a receiving direction table created by the all-channel scanning process in the TV broadcast receiver prior to the receiving direction editing process.

FIG. 6 is a view showing an example of a receiving direction table 50 created by the above all-channel scanning process. The receiving direction table 50 stores best receiving directions 52 and register channel information 53 that correspond to channel numbers 51. In FIG. 6, each on-state of register flag is indicated by mark "○", while each off-state of register flag is indicated by a blank space. Further, respective numbers shown in the column of the best receiving directions 52 correspond to the receiving directions D1 to D16 of the smart antenna 2 shown in FIG. 3 (for example, "2" corresponding to the receiving direction "D2", and "3 corresponding to the receiving direction D3").

Figure 7:
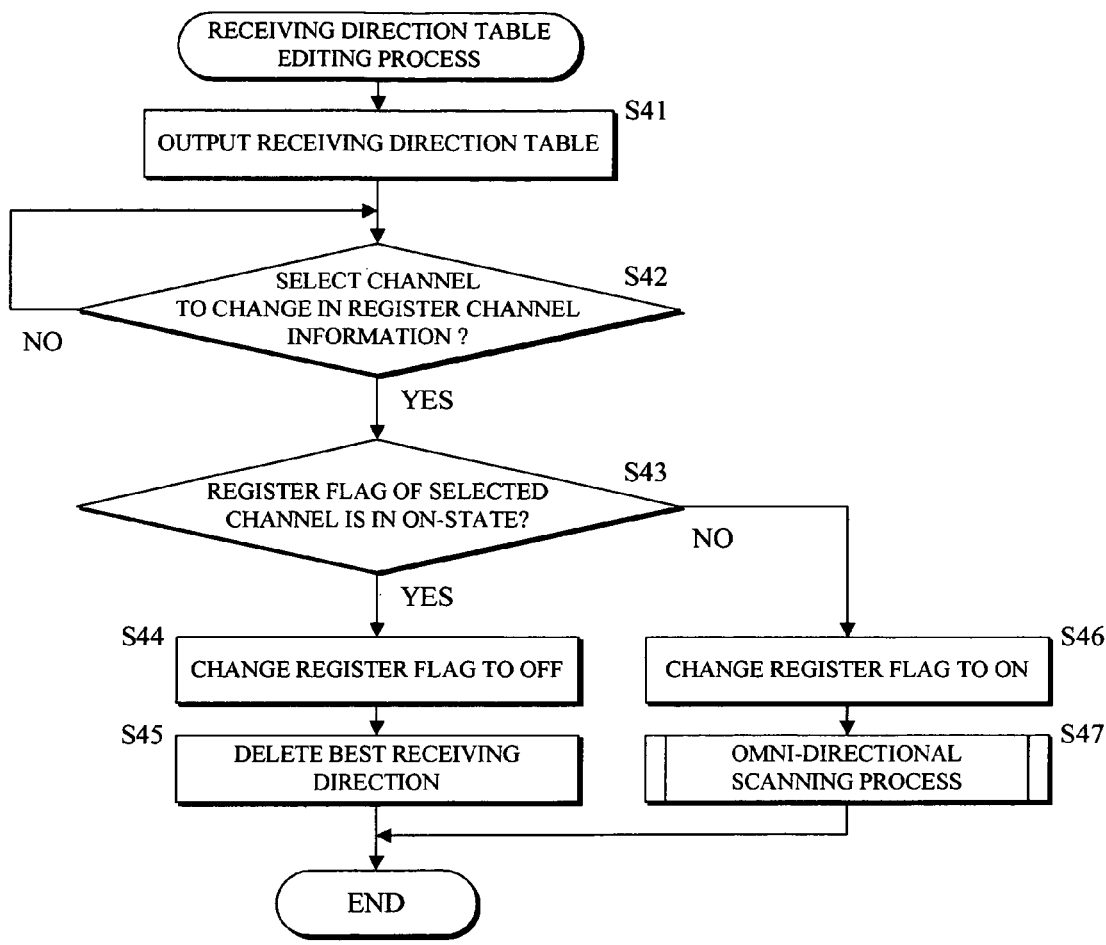
FIG. 7 is a flow chart showing a receiving direction table editing process according to the TV broadcast receiver.

Next, referring to FIG. 7 to FIG. 9, a receiving direction table editing process for editing the receiving direction table 50 will be described. Referring to the flow chart of FIG. 7, when a user operates the operation unit 18 to select the receiving direction table editing mode, the microprocessor 15 reads a receiving direction table 50 stored in the memory 16, and outputs the receiving direction table 50 in a predetermined format on a monitor screen 30 of the monitor 3 (S41).

Figure 8:
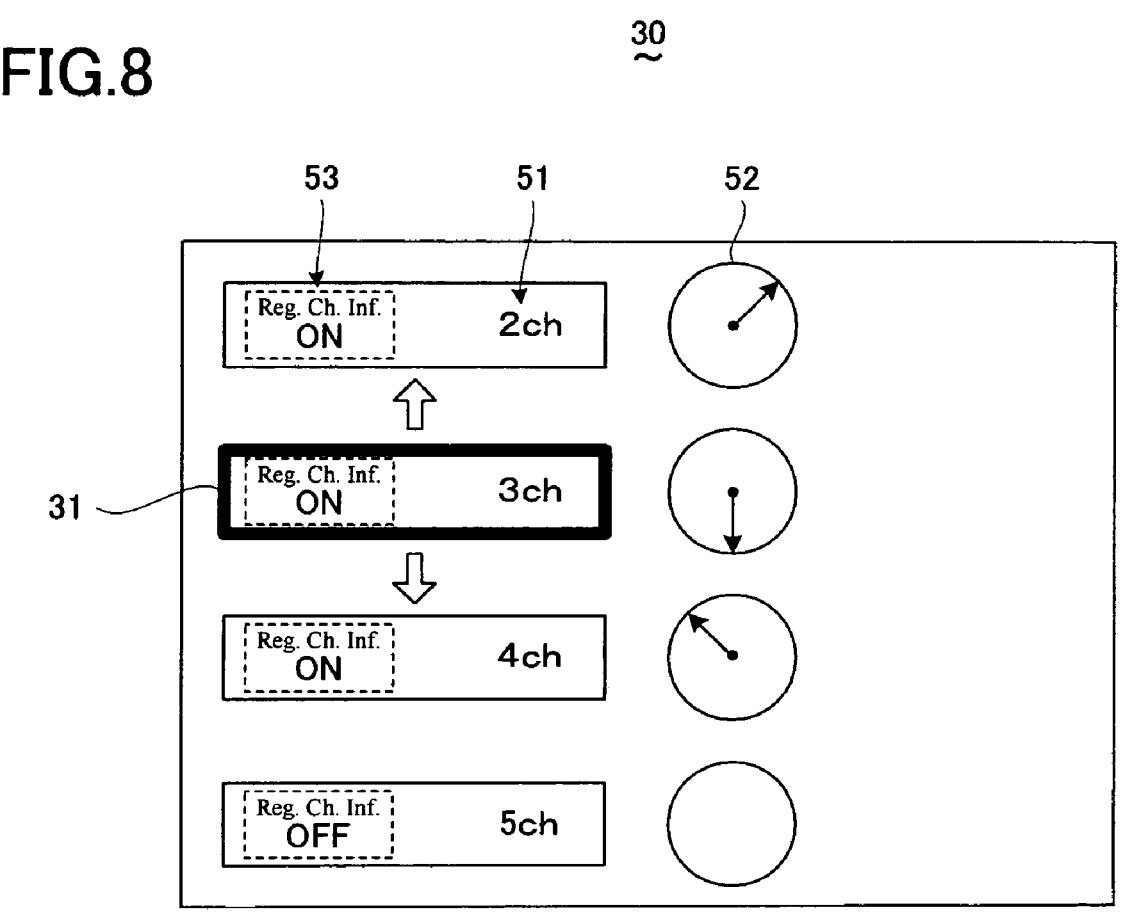
FIG. 8 is a schematic view showing an example of a monitor screen for the receiving direction table editing process.

FIG. 8 shows an example of the monitor screen 30 which is displayed on the monitor 3 for the receiving direction table editing process, and which displays channel numbers 51, best receiving directions 52 and register channel information 53, on the basis of the receiving direction table 50 shown in FIG. 6. In the example of the monitor screen 30 of FIG. 8, channels "2ch", "3ch", "4ch" and "5ch" are displayed as the channel numbers 51, and best receiving directions 52 for the respective channels except for "5ch" in the off-state of the register flag are shown by arrows each in a circle. Further, the channels "2ch", "3ch" and "4ch", which are registered in the receiving direction table 50 as selectable channels, are each indicated by "ON", while the channel "5ch" registered as a non-selectable channel is indicated by "OFF". On the monitor screen 30, the user selects a channel to change in the register channel information 53 by operating a cursor 31 using the operation unit 18.

When the user selects the channel to change in the register channel information 53 (YES in S42), the microprocessor 15 determines whether or not the register flag of the selected channel is in the on-state (S43). If the register flag of the selected channel is ON, i.e. in the on-state (YES in S43), the microprocessor 15 changes the register flag to OFF, i.e. the off-state (S44). At this time, the microprocessor 15 (receiving direction table editing unit 15d) deletes the best receiving direction 52 of the selected channel from the receiving direction table 50 (S45). In other words, when a channel registered in the receiving direction table 50 as a selectable channel is newly registered in the receiving direction table 50 as a non-selectable channel, the microprocessor 15 (receiving direc-tion table editing unit 15d) deletes the best receiving direction 52 of such channel from the receiving direction table 50.

On the other hand, if the register flag of the selected channel is OFF, i.e. in the off-state (NO in S43), the microprocessor 15 changes the register flag to ON, i.e. the on-state (S46), and immediately performs an omni-directional scanning process (S47) so as to determine a best receiving direction of the channel, and to register the thus determined best receiving direction of the channel in the receiving direction table 50. In other words, when a channel registered in the receiving direction table 50 as a non-selectable channel is newly registered in the receiving direction table 50 as a selectable channel, the microprocessor 15 (omni-directional scanning unit 15b) determines the best receiving direction 52 of the channel, and register the determined best receiving direction of the channel in the receiving direction table 50.

FIG. 9 is a view showing the receiving direction table 50 after the receiving direction table editing process described above. As apparent from FIG. 6 and FIG. 9, when the state of the receiving direction table 50 shown in FIG. 6 prior to the receiving direction editing process is changed by the operation of the user such that the state of the register flag for channel "3ch" is changed from the on-state to the off-state, the microprocessor 15 (receiving direction table editing unit 15d) deletes the best receiving direction "9" from the receiving direction table 50. On the other hand, when the state of the receiving direction table 50 shown in FIG. 6 prior to the receiving direction editing process is changed by the operation of the user such that the state of the register flag for channel "5ch" is changed from the off-state to the on-state, the microprocessor 15 (omni-directional scanning unit 15b) immediately performs an omni-directional scanning process so as to determine a best receiving direction "8", and to register the thus determined best receiving direction "8" in the receiving direction table 50.

This produces the following effect. For example, even if the receiving condition for channel "5ch", whose best receiving direction was "7" prior to the receiving direction table editing process (refer to FIG. 6), has changed due to a change e.g. of use environment, it is possible to register, in the receiving table 50, a best receiving direction "8" (refer to FIG. 9) at the time of editing the receiving direction table 50 by performing an omni-directional scanning process again at the time of the receiving direction the editing process, thereby flexibly responding to changes of receiving conditions of receiving TV broadcast signals.

As described in the foregoing, the TV broadcast receiver 1 of the present embodiment makes it possible to change the register channel information 53 based on the operation of the operation unit 18 by a user. Accordingly, the user can optionally set selectable channels. Thus, for example, the user can preliminarily delete channels in bad receiving conditions from candidates of selectable channels.

When based on the operation of the operation unit 18 by the user, a channel registered in the receiving direction table 50 as a selectable channel is newly registered in the receiving direction table 50 as a non-selectable channel, the best receiving direction 52 in the receiving direction table 50 is deleted from the receiving direction table 50. This makes it possible to reduce the amount of information stored in the memory 16, thereby saving capacity of the memory 16. In addition, when based on the operation of the operation unit 18 by the user, a channel registered in the receiving direction table 50 as a non-selectable channel is newly registered in the receiving direction table 50 as a selectable channel, a best receiving direction 52 of the channel can be easily renewed by an omni-directional scanning process.

Furthermore, when the user operates to change the register channel information 53, then the channel numbers 51, the best receiving directions 52 and the register channel information 53 are displayed on the monitor 3. Thus, the user can change the register channel information 53 while referencing the content of the receiving table information 50. Besides, the content of the receiving direction table 50 can be easily renewed by performing the all-channel scanning process.

It is to be noted that the present invention is not limited to the above embodiments, and various modifications are possible. For example, according to the above embodiment, the TV broadcast receiver 1 displays the channel numbers 51, the best receiving directions 52 and the register channel information 53 on the monitor screen 30 in the receiving direction table editing mode. However, the TV broadcast receiver 1 can also be designed to additionally display signal intensity of each best receiving direction on the monitor screen 30 so as to make it possible for the user to recognize channels in bad receiving conditions at a glance. Furthermore, the TV broadcast signals which the TV broadcast receiver 1 can receive are not limited to digital television broadcast signals, but can be analog television broadcast signals. In addition, the number of receiving directions of the smart antenna 2 is not limited to sixteen as exemplified in the above embodiment, but can be another number such as four or eight.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A television broadcast receiver connected to a multi-directional antenna having predetermined multiple receiving directions for receiving a television broadcast signal, transmitted in one of multiple channels from one of multiple broadcast stations, by making one of the multiple receiving directions active, the television broadcast receiver comprising:

a tuner connected to the multi-directional antenna for receiving a television broadcast signal;

a memory for storing a receiving direction table containing information of channel numbers of the channels transmitted from the broadcast stations, information of best receiving directions of the multi-directional antenna for receiving the channels, and register channel information indicating whether the channels are registered therein as selectable channels or non-selectable channels;

a channel selection control unit for controlling a channel selection operation for a channel registered in the receiving direction table as a selectable channel in a manner that based on the receiving direction table stored in the memory, the channel selection control unit outputs, to the multi-directional antenna, a receiving direction control signal to command the multi-directional antenna for an active receiving direction, and also outputs, to the tuner, a channel control signal to command the tuner for a channel to select;

an omni-directional scanning unit for performing an omni-directional scanning process: of sequentially outputting the receiving direction control signal to the multi-directional antenna to sequentially command the multi-directional antenna for all the receiving directions, and to receive the television broadcast signal in the respective receiving directions; and of determining the best receiving direction and the register channel information of arbitrary one of the channels, transmitted from the broadcast stations, on the basis of signal intensities of the television broadcast signal in the respective receiving directions; and further of renewing the content of the receiving direction table on the basis of the determination;

a user interface to be operated by a user for manually changing the register channel information of the receiving direction table stored in the memory;

a receiving direction table editing unit for performing a receiving direction table editing process in a manner:

that when based on the operation of the user interface by the user, a channel registered in the receiving direction table as a selectable channel is newly registered in the receiving direction table as a non-selectable channel, the receiving direction table editing unit deletes the best receiving direction of the channel in the receiving direction table; and that when based on the operation of the user interface by the user, a channel registered in the receiving direction table as a non-selectable channel is newly registered in the receiving direction table as a selectable channel, the omni-directional scanning unit determines a best receiving direction of the channel, and stores the thus determined best receiving direction in the receiving direction table;

an output circuit for outputting, to a monitor, an image showing the channel numbers, the best receiving directions and the register channel information of respective channels registered in the receiving direction table when the user operates to change the register channel information in the receiving direction table stored in the memory; and an all-channel scanning unit for causing the omni-directional scanning unit to repeat the omni-directional scanning process for determining the best receiving direction and the register channel information of each of all the channels transmitted from the broadcast stations, and for renewing the content of the receiving direction table on the basis of the determination.

\* \* \* \* \*